Figure 1:
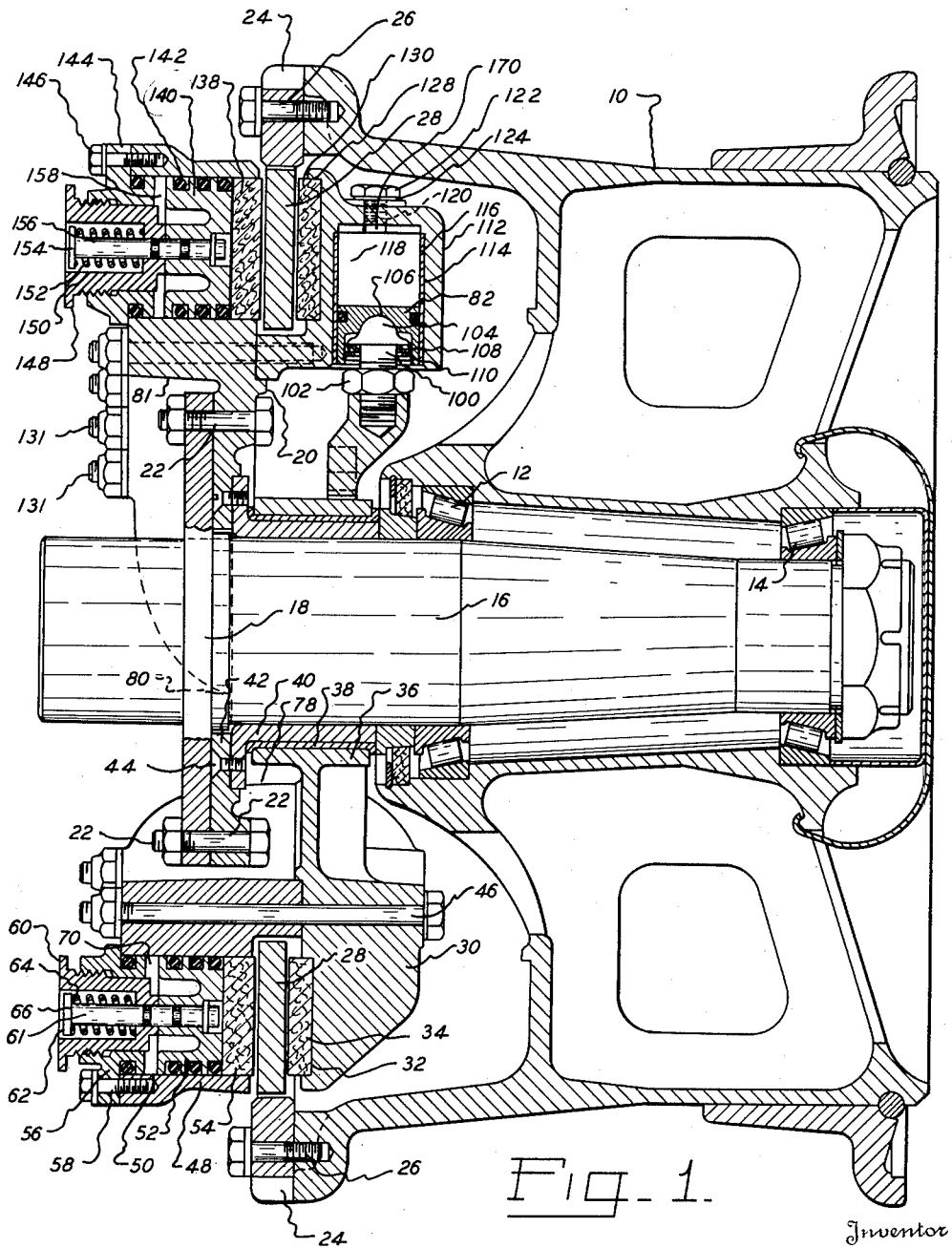

May 13, 1952 C. HOLLERITH 2,596,556
BRAKE STRUCTURE
Filed July 10, 1946 4 Sheets-Sheet 1

Fig_1.

Inventor
CHARLES HOLLERITH
By Beaman + Patch
Attorneys

May 13, 1952  C. HOLLERITH  2,596,556
BRAKE STRUCTURE
Filed July 10, 1946  4 Sheets-Sheet 4

Inventor
CHARLES HOLLERITH
By Beaman & Patch
Attorneys

Patented May 13, 1952

2,596,556

UNITED STATES PATENT OFFICE 2,596,556

BRAKE STRUCTURE

Charles Hollerith, Jackson, Mich., assignor, by mesne assignments, to The B. F. Goodrich Company, Akron, Ohio, a corporation of New York Application July 10, 1946, Serial No. 682,671

4 Claims. (Cl. 188—152)

The present invention relates to improvements in disc brakes.

An object of the invention is to provide an improved disc brake of the type in which a radial disc is rotated between brake elements imposed upon only a fractional portion of the braking surface of the disc, with the remaining portion exposed for radiation.

Another object is to provide an improved brake of the type described in the previous paragraph in which the brake elements on opposite sides of the discs are in the form of relatively small circular blocks to provide circumferentially spaced localized areas of high unit pressure between which the rotating disc is floated.

A further object of the invention is to provide a radial disc type brake in which improved servo-action has been devised.

A still further object is to provide an improved hydraulic servo-brake of the type described in the first-stated object in which the actuating pressure for the opposed brake elements is developed by displacement of a movable wall of a closed system through a frictional coupling with the radial disc.

Another object is to provide an improved hydraulic brake system in the form of a closed system intimately associated with a wheel structure and actuated by servo-action.

A further object is to provide a hydraulic brake system in the form of a closed system entirely contained at the wheel and having a servo-mechanical coupling with a rotating part of the wheel.

A still further object of the invention resides in the novel arrangement for developing linear movements in a hydraulic cylinder through a frictional coupling with a rotated source of energy.

These and other objects and advantages residing in the details of construction, arrangement and combination of parts will more fully appear and be appreciated by those skilled in the art from a consideration of the following specification and the concluding claims.

Figure 2:
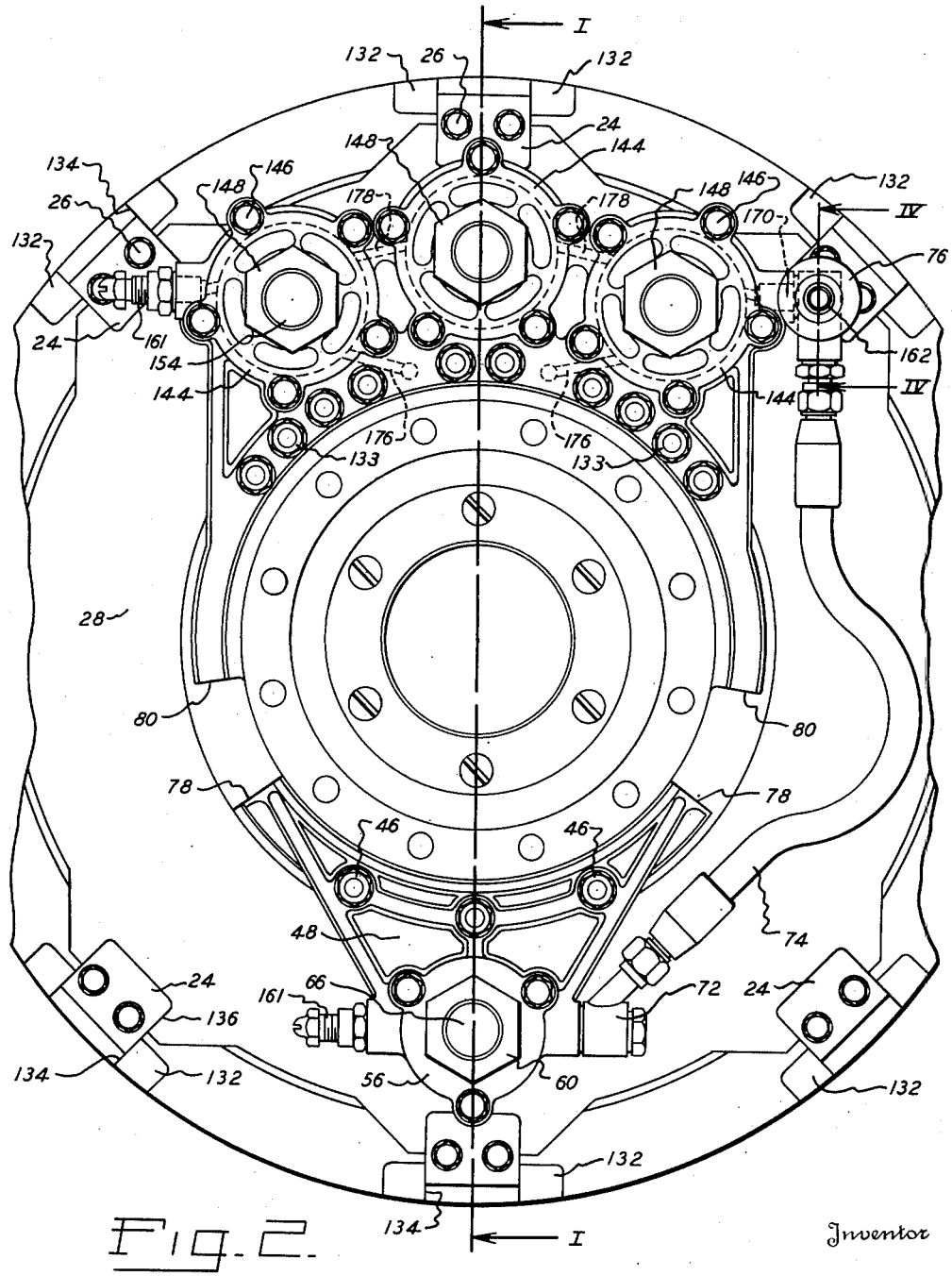
Figure 3:
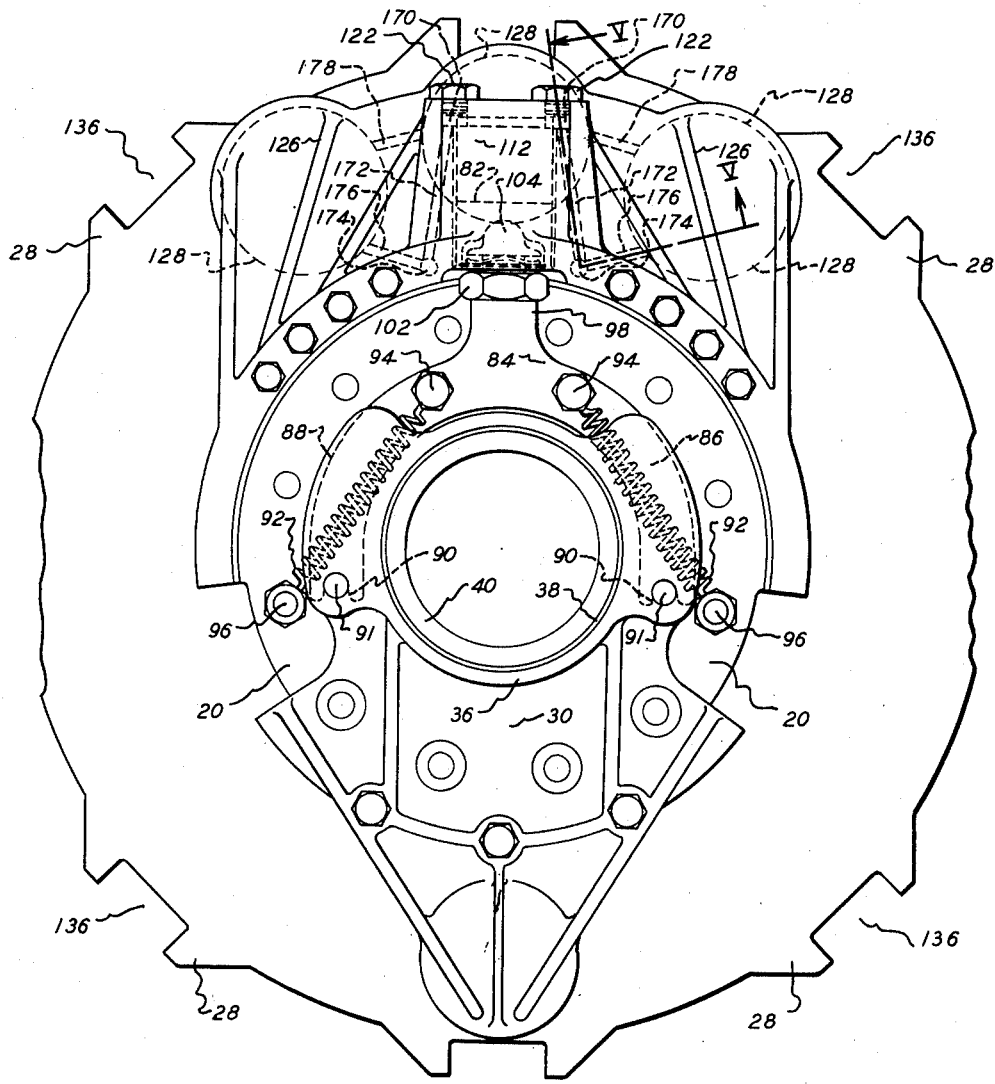
Figure 4:
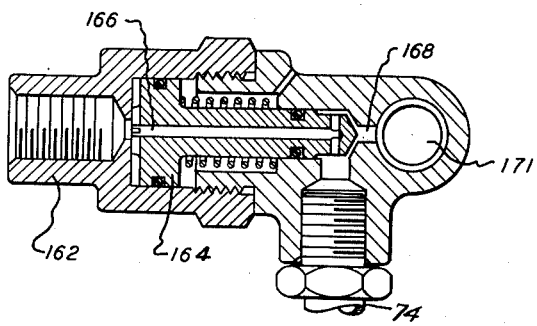
Figure 5:
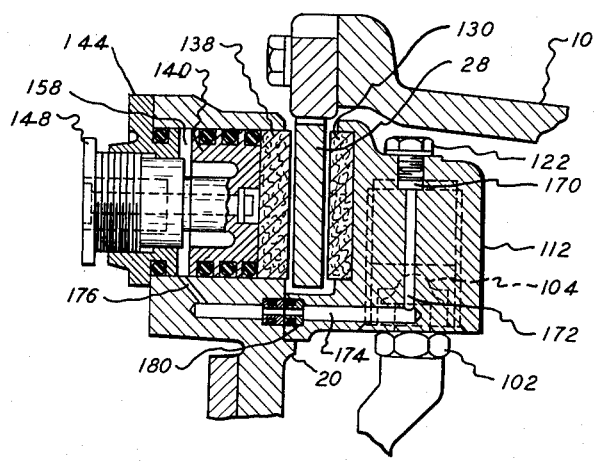

In the drawings,

Fig. 1 is a vertical cross-sectional view through an aircraft wheel embodying the principles of the present invention and taken on line I—I of Fig. 2, Fig. 2 is an elevational view of the brake structure viewed from the inside and to the right as shown in Fig. 1, Fig. 3 is an outside view of the brake structure with the wheel removed, Fig. 4 is a cross-sectional view through the distributor valve on the line IV—IV of Figure 2, and Fig. 5 is a fragmentary sectional view taken on line V—V of Fig. 3.

Referring to the drawings, and particularly to Fig. 1, the principles of the invention have been illustrated in connection with an aircraft wheel 10 of cast construction supported upon suitable bearings 12 and 14 for rotation upon the fixed axle 16 equipped with a flange 18 to which the brake structure generally designated by reference character 20 is attached by bolts 22. Torque members 24 are fixedly attached to the wheel 10 by screws 26. The radial disc 28 has a tongue and groove connection with the torque members 24 so that it is driven thereby as a unit with the wheel 10. The disc 28, however, is capable of floating action in an axial direction as will be more fully described.

Servo-mechanism

As more clearly shown in Figs. 1 and 3, the servo operating mechanism for developing the brake applying hydraulic pressure comprises a rigid cast part 30 having a cylindrical recess 32 in which is supported a brake block 34 of corresponding shape. As an integral part of the member 30, a collar 36 is provided which is supported for slight relative rotational movement upon the bearing sleeve 38 which is in turn mounted upon the flange sleeve 40 attached to the torque flange 42 by screws 44. The torque flange of the brake 20 is in turn fastened to the flange 18 of the axle 16 by bolts 22.

Secured to the member 30 by tie bolts 46 is a casting 48 which extends across the inside of the brake disc 28 and then radially outwardly to provide a portion on the opposite side of the disc 28 from the member 30 in which is defined a cylinder 50. Mounted in the cylinder 50 is a piston 52 having secured to its outer face a cylindrical brake block 54. The hood 56 for the cylinder is in the form of a casting secured by studs 58 threaded into the member 48. Threadably secured and axially adjustable in the head 56 is an adjustment nut 60 having a central chamber 62 to receive a spring 64 which acts against the head 66 of the bolt 61 to retract the piston 52 and its associated brake block 54. By screwing the nut 60 in or out the clearance between the disc 28 and the brake block 54 may be adjusted. The chamber in which hydraulic pressure is directed to actuate the piston 52 in the cylinder 50 is indicated by reference character 70. As more clearly shown in Fig. 2 the chamber 70 is in communication with the fitting 72 which is in turn connected by a flexible hose line 74 to the servo distributor valve 76 more fully shown in Fig. 4. Movement of the member 30 and its associated parts is determined by the clearance between the shoulders 78 and the stops 80 upon the main body portion 81 of the brake 20.

It will be readily understood that when hydraulic stress is directed into the chamber 70 that the spring 64 will be pressed and the brake disc 28 will be clamped between the brake blocks 34 and 54. This action sets up a frictional drag tending to cause the member 30 to rotate with the disc 28 resulting in a partial rotation of the member 30 either clockwise or counterclockwise, depending upon direction of rotation of the wheel 10. Such partial rotation has its maximum limits defined by the point of engagement between the shoulders 78 and stops 80.

The mechanism for transforming partial rotation of the member 30 into linear movement capable of moving a servo piston 82 is more clearly shown in Fig. 3 and comprises a yoke-shaped member 84 having arcuate arms 86 and 88 with the ends thereof forked at 90 to engage with pins 91 attached to the member 30. Tension springs 92 connected at 94 at their upper end to the yoke member 84 are connected at their lower end at 96 to the brake 20. It will be noted that the pins 91 are slightly below the center of rotation.

The yoke member 84 has a central stem 98 in which is adjustably threaded a stud 100 locked in positions of adjustment by the lock nut 102. At its upper end stud 100 has a ball portion 104 which fits into a corresponding socket 106 in the piston 82. The piston 82 is held assembled to the stud 100 through a spring washer 108 held in position by a snap ring 110. Casting 112 has a cylindrical bore 114 in which a sleeve 116 is press-fitted to provide a cylinder for the piston 82 to operate. The chamber in which hydraulic pressure is developed by movement of the piston 82 is indicated by reference character 118. A bleeder hole is indicated at 120 for bleeding any air from the piston and this hole is sealed by a suitable screw 122 acting against a sealing washer 124. The member 112, preferably a casting reinforced by suitable webs 126, is illustrated as having three cylindrical recesses 128 in which are supported similarly shaped brake blocks 130. A plurality of studs 131 are threaded into a member 112 to receive nuts 133 to firmly secure member 112 and the main body 81 to the brake 20.

With the member 112 fixedly attached to the fixed brake 20, and the ball member 104 of the stud 100 held within the socket 106, counterclockwise rotation of the member 30 as viewed in Fig. 3 will result in the righthand pin 91 lifting the yoke 84 against the tension of the corresponding spring 92. Such upward movement of the yoke 84 will result in similar movement being imparted to the piston 82 to build up a pressure in the chamber 118.

Disc mechanism

The wheel 10 is cast with a plurality of bosses 132 defining thrust shoulders 134 and between which the torque members 24 are located and held in position by screws 26. The depending portion of each torque member 24 projects into the slots 136 of the radial brake disc 28 as more clearly shown in Figs. 2 and 3. It is to be understood that the members 24 have a sliding fit in the slots 136 to permit the disc 28 to have a floating movement in an axial direction between the brake blocks 34 and 54 as well as between the brake blocks 130 and 138.

Brake mechanism

The principal braking action upon the disc 28 to control rotation of the wheel 10 is performed by the clamping action of the disc 28 between brake blocks 130 and 138. The brake blocks 138 are attached to the pistons 140 which in the illustrated form of the invention are three in number and may correspond in structure to the pistons 52. The cylinders 142 in which the pistons 140 operate has a head 144 held in position by studs 146. The adjustment nut 148 is threaded in the head 144 and is recessed at 150 to receive the spring 152 acting against the head 154 of the shank 156 connected with piston 140. The nut 148 is adjusted in the head 144 to control the clearance between the brake blocks 130, 138 and the disc 28. The hydraulic pressure developed in the chamber 118 is in communication with the chambers 158 of the cylinders 142 so as to move the piston 140 and their associated brake blocks 138 toward the disc 28. The hydraulic circuit will be described hereinafter.

Hydraulic circuit

In service, the brake structure will be mounted with the line I—I of Fig. 2 horizontally disposed. This will dispose the bleeder port 161 at the top so that any air may be removed from the system at the time it is filled with hydraulic fluid. The valve 76 is connected with the usual pedal master cylinder at the inlet 162 (see Fig. 4) through a suitable conduit not shown. When the pedal is initially actuated, the piston 164 is in the position shown. Upon initial flow of fluid pressure, the piston 164 is moved to the right as viewed in Fig. 4 to close the port 168 communicating with chambers 158 through the passage 171. Thereafter, the entire flow of fluid pressure is through the line 74 to the chamber 70.

Displacement of the piston 52 by fluid pressure in the chamber 70 results in the displacement of the piston 82 in the chamber 118 through the chain of mechanism heretofore described. The fluid pressure developed in the chamber 118 leaves the chamber 118 through transverse passages 170, and is delivered to the outside chambers 158 through passages 172, 174 and 176. The central chamber 158 is supplied through passages 178 communicating with the outside chambers 158. As shown in Fig. 5, each passage 174 has a joint between the body 81 and the member 112 sealed by an insert 180 having sealing rings engaging with counterbores located on each side of the joint.

The "feel" of brake application is carried back to the foot pedal by the pressure developed in chambers 158 being fed back through the connection 170 and the port 168 against the piston valve 164, as will readily be understood. As only a running clearance is required between the disc 28 and the block 54, a very small amount of fluid need be delivered to the chamber 70 to effect a much greater displacement of fluid in the chamber 118. This arrangement materially reduces the time lag between pedal actuation and brake application.

In the appended claims, the pistons 52, 82, and 140 are referred to as displaceable walls in order to bring within the scope of the present invention the diaphragm and other equivalent structure for accomplishing the same result.

Having thus described my invention, what I claim as new and desire to cover by Letters Patent is:

1. A servo-type wheel brake structure comprising in combination with a rotatable wheel body part and shaft mounting therefor, a radial brake disc extending between said shaft and wheel body, axially extending pin and slot connection means between said brake disc and said wheel body for rotation by the latter, while enabling axial floating movement of the brake disc relative to said wheel to take place, a brake structure on said shaft, said brake structure including opposed brake pads on opposite sides of said brake disc and in circumferentially adjacent assembly thereto, hydraulic pressure fluid displacement means operatively associated with said brake pads to effect braking engagement of the latter with said disc, conduit means for connection to a remote source of brake applying hydraulic pressure to initiate the brake application, a servo-mechanism for augmenting the brake applying hydraulic pressure, said servo-mechanism comprising an actuator structure rotatably mounted about said shaft for limited oscillatory motion in opposite directions, a hydraulic pressure actuated rotation retarding means for said disc and carried by said actuator structure in diametral relation to said brake pad assembly, a hydraulic chamber on said brake structure, a fluid displacement wall in said chamber, an operating member for said wall, means connecting said operating member with said actuator structure to effect movement of said wall by oscillation of the said actuator structure in either direction, and hydraulic connections between said rotation retarding means, servo-chamber and hydraulic pressure fluid displacement means adapted to effect operation of the latter to apply the braking pressure under the control of said servo-mechanism.

2. The invention as defined in claim 1, said means connecting said operating member with said actuator structure comprising a yoke member centrally connected with the displacement wall of said servo chamber, and means connecting opposite ends of said yoke member with said oscillatory actuating structure to convert partial rotary movement of the latter in either direction into linear movement of said displacement wall of said servo-chamber.

3. A servo-type radial disc wheel brake comprising in combination with a wheel, a radial brake disc of annular shape rotatable with the wheel, brake means located on one side of said disc and selectively engageable therewith, a displaceable wall located upon the same side of said disc as said brake means and operatively connected to said brake means, a second displaceable wall located upon the opposite side of said disc from said first wall, relatively fixed wall structure associated with said walls to define chambers, conduit means defined by structure connecting said chambers and extending between opposite sides of said disc across the inner peripheral edge thereof, servo means including an oscillatable actuator structure disposed upon said opposite side of said disc, a friction member selectively engageable with said disc, means for moving said friction member into engagement with said disc, means supporting said member on said first side of said disc, said member supporting means being carried by said actuator structure across the inner peripheral edge of said disc, engagement between said friction member and said disc reacting through said supporting means to impart partial rotation to said actuator structure in one direction or the other depending upon the direction of rotation of said wheel, means engaged and operated by the oscillation of said actuator in either direction and operatively connected to said second displaceable wall to displace fluid from one of said chambers into the other to displace said first wall to actuate said brake means into braking engagement with said disc.

4. A servo-type radial disc wheel brake having a substantially self-contained hydraulic actuating system comprising a radial rotatable disc of annular shape, a fixed mounting structure, a brake part selectively engageable with and supported on one side of said disc, a displaceable wall operatively connected to said brake part and disposed on the same side of said disc, a second displaceable wall supported in said fixed structure on the opposite side of said disc, wall structure defining first and second chambers associated with said first and second walls, respectively, hydraulic connection structure extending between said first and second chambers and across the inner-peripheral edge of said disc, an oscillatable actuator carried in said mounting structure and disposed on the side of said disc opposite from said brake part, friction means engageable with said disc to energize said actuator to oscillate the same in one direction or the other depending upon the direction of rotation of said disc, said friction means including a displaceable wall, wall structure associated with said last wall and defining a third chamber, a hydraulic connection between said third chamber and said first and second chambers, means engaged and operated by the oscillation of said actuator in either direction and operatively connected to said second displaceable wall to displace fluid from one of said first and second chambers into the other to displace said first wall to actuate said brake part into braking engagement with said disc, and a hydraulic connection between said third chamber and a source of fluid pressure to initiate the servo-action.

CHARLES HOLLERITH.

REFERENCES CITED

The following references are of record in the file of this patent:

UNITED STATES PATENTS

| Number | Name | Date |
|---|---|---|
| 2,414,753 | Majneri | Jan. 21, 1947 |
| 2,419,113 | Bricker | Apr. 15, 1947 |

FOREIGN PATENTS

| Number | Country | Date |
|---|---|---|
| 439,894 | Great Britain | Mar. 19, 1935 |